United States Patent [19]

Masuda

[11] Patent Number: 5,558,483
[45] Date of Patent: Sep. 24, 1996

[54] ARTICLE TRANSFER APPARATUS WITH VACUUM OPERATED WORK HOLDER AND ARTICULATED WORK HOLDER MOVER

[75] Inventor: Junichi Masuda, Kounan, Japan

[73] Assignee: Murata Kikai Kabushiki Kaisha, Kyoto, Japan

[21] Appl. No.: 440,655

[22] Filed: May 15, 1995

[30] Foreign Application Priority Data

May 17, 1994 [JP] Japan .................................. 6-128121

[51] Int. Cl.⁶ ................................................. B65G 1/04
[52] U.S. Cl. ......................... 414/278; 294/65; 414/280; 414/281; 414/661
[58] Field of Search ................................... 414/278, 280, 414/661, 751, 752, 281–283; 294/64.1, 65

[56] References Cited

U.S. PATENT DOCUMENTS

| | | | |
|---|---|---|---|
| 3,750,804 | 8/1973 | Lemelson | 414/278 X |
| 3,782,564 | 1/1974 | Burt | 414/281 |
| 3,820,667 | 6/1974 | Critchlow et al. | 414/752 X |
| 3,884,278 | 5/1975 | Nakashima | 414/752 X |
| 4,299,533 | 11/1981 | Ohnaka | 414/752 |
| 4,492,504 | 1/1985 | Hainsworth | 414/278 X |
| 5,085,553 | 2/1992 | Bouwens et al. | 414/661 X |
| 5,129,777 | 7/1992 | Pohjonen et al. | 414/280 |
| 5,222,856 | 6/1993 | Yamamoto et al. | 414/661 |
| 5,380,139 | 1/1995 | Pohjonen et al. | 414/278 |
| 5,421,685 | 6/1995 | Elmer et al. | 414/280 |

FOREIGN PATENT DOCUMENTS 294410  11/1993  Japan ..................... 414/283

*Primary Examiner*—David A. Bucci
*Attorney, Agent, or Firm*—Armstrong, Westerman, Hattori, McLeland & Naughton

[57] ABSTRACT

An article transfer apparatus is described which is movable along a row of article storage racks and comprises an article carrier having a conveyor and an article holder disposed above the article carrier and containing a plurality of suction cups. The article holder includes mechanism which, after the suction cups have been pushed against an article to suck and attract the article, there is operable via a folding motion of first and second swing arms, or alternatively, in conjunction with a movement of a front-back moving member simultaneously with such folding motion of the swing arms, and an article carrying conveyor is synchronously driven in an article pulling-in direction, whereby the article can be put onto the article carrying conveyor.

4 Claims, 8 Drawing Sheets

ARTICLE TRANSFER APPARATUS WITH VACUUM OPERATED WORK HOLDER AND ARTICULATED WORK HOLDER MOVER

BACKGROUND OF THE INVENTION

1. Field of the Invention

The present invention relates to an article transfer apparatus mounted, for example, to a lift of a stacker crane in an automated warehouse.

2. Prior Art

Heretofore, as this type of an article transfer apparatus there has been known one wherein a slide fork is mounted to a lift (article carrier) so as to be movable in a front-to-back direction.

The said slide fork can perform such operations as protruding an article downward, lifting the article with ascent of the lift and retraction to the lift side, and thereby take in the article onto the lift. Further, by operations reverse to those operations, the slide fork can take down the article onto an article storage rack.

The above conventional article transfer apparatus has the following drawbacks.

Firstly, at the time of transferring or receiving an article to or from an article storage rack, the lift must be moved up or down in a projected state of the slide fork, so it is necessary that a space for vertical movement of the slide fork be provided between the article stored on the article storage rack and an overlying article storage rack. Since this space is a dead space, the article storage efficiency is reduced to an extent corresponding to the spaces provided between adjacent article storage racks.

Secondly, since each article storage rack has so far been required to have a clearance for passage of the slide fork therethrough, the conventional article transfer apparatus cannot be used for an article storage rack formed by a single plate.

SUMMARY OF THE INVENTION

It is an object of the present invention to provide an article transfer apparatus which can surely transfer articles without vertical movement, such as in a slide fork.

According to the means which the present invention has adopted for eliminating the above-mentioned drawbacks, the article transfer apparatus of the invention is provided with an article carrier having a conveyor whose conveyance direction is perpendicular to a row of article storage racks and is also provided with an article holder disposed above the article carrier so as to be movable also in a perpendicular direction to a row of article storage racks, the article holder being retractable from above the article carrier.

The present invention performs the following operations.

After an article has been grasped by the article holder, the article holder is retracted and the conveyor of the article carrier is driven in an article take-in direction, whereby the article can be put smoothly onto the article carrier. On the other hand, by pushing out the article on the article carrier by means of the article holder and driving the article carrier in an article push-out direction, the article can be taken down smoothly from the article carrier onto an article storage rack. In the case where an article is to be pushed out in the direction opposite to the take-in direction, the article holder is retracted from above the article carrier to a position not interfering with the article, whereby regrasping of article can be done easily.

DETAILED DESCRIPTION OF PREFERRED EMBODIMENT

Figure 1:
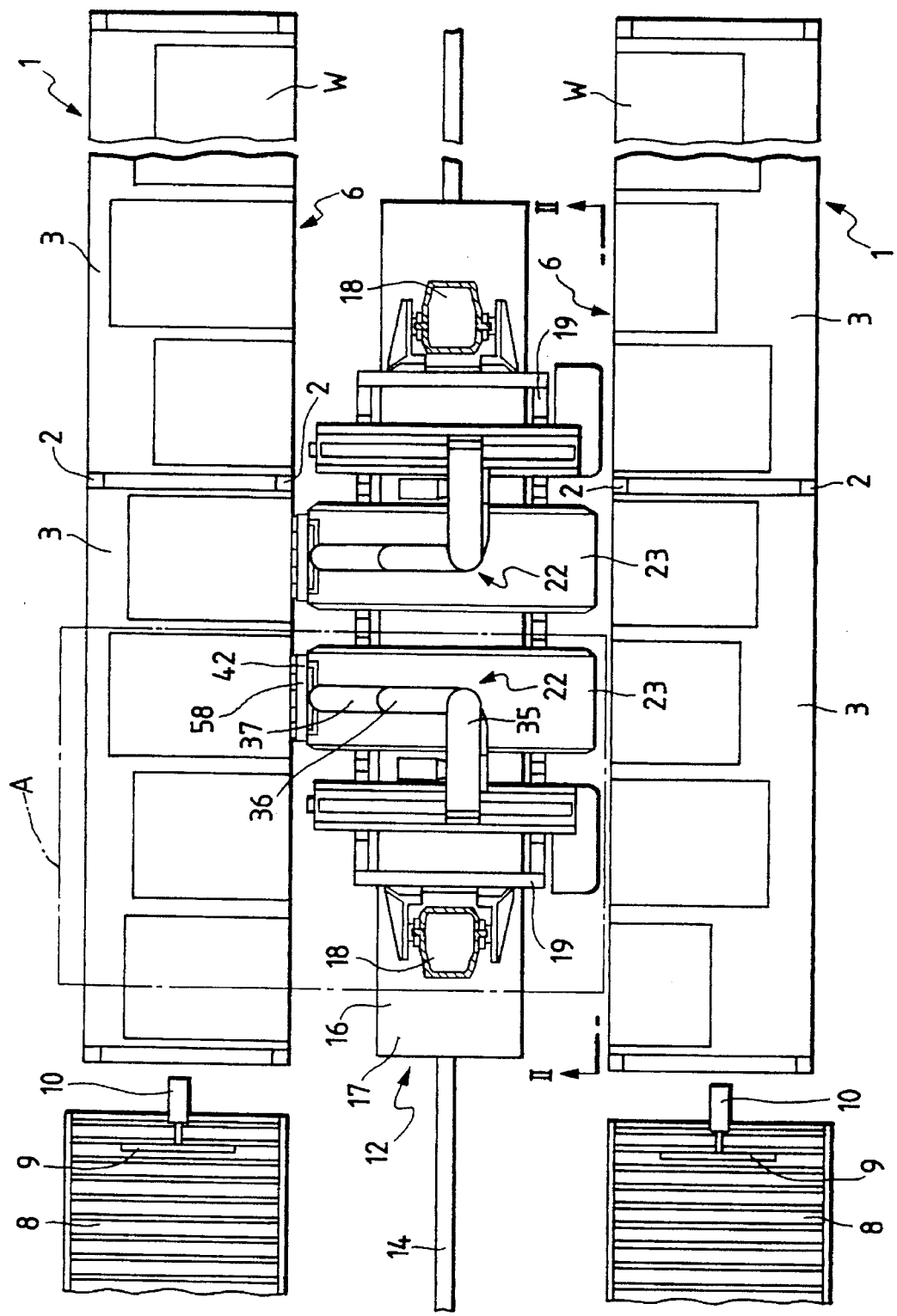
FIG. 1 is a schematic plan view with an intermediate portion omitted, showing an embodiment of the present invention.
Figure 2:
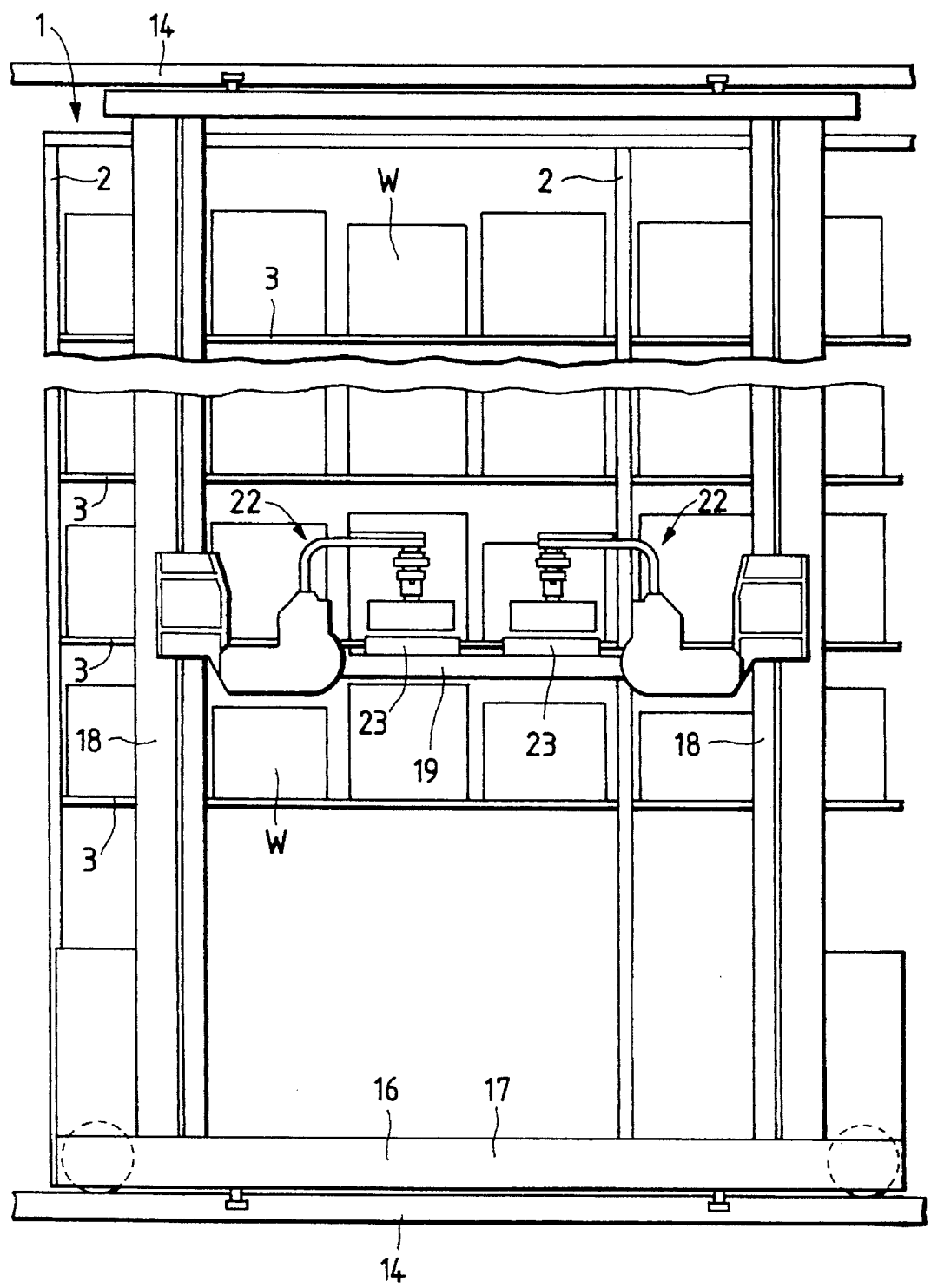
FIG. 2 is an enlarged side view taken along line II—II in FIG. 1, with an intermediate portion omitted.
Figure 3:
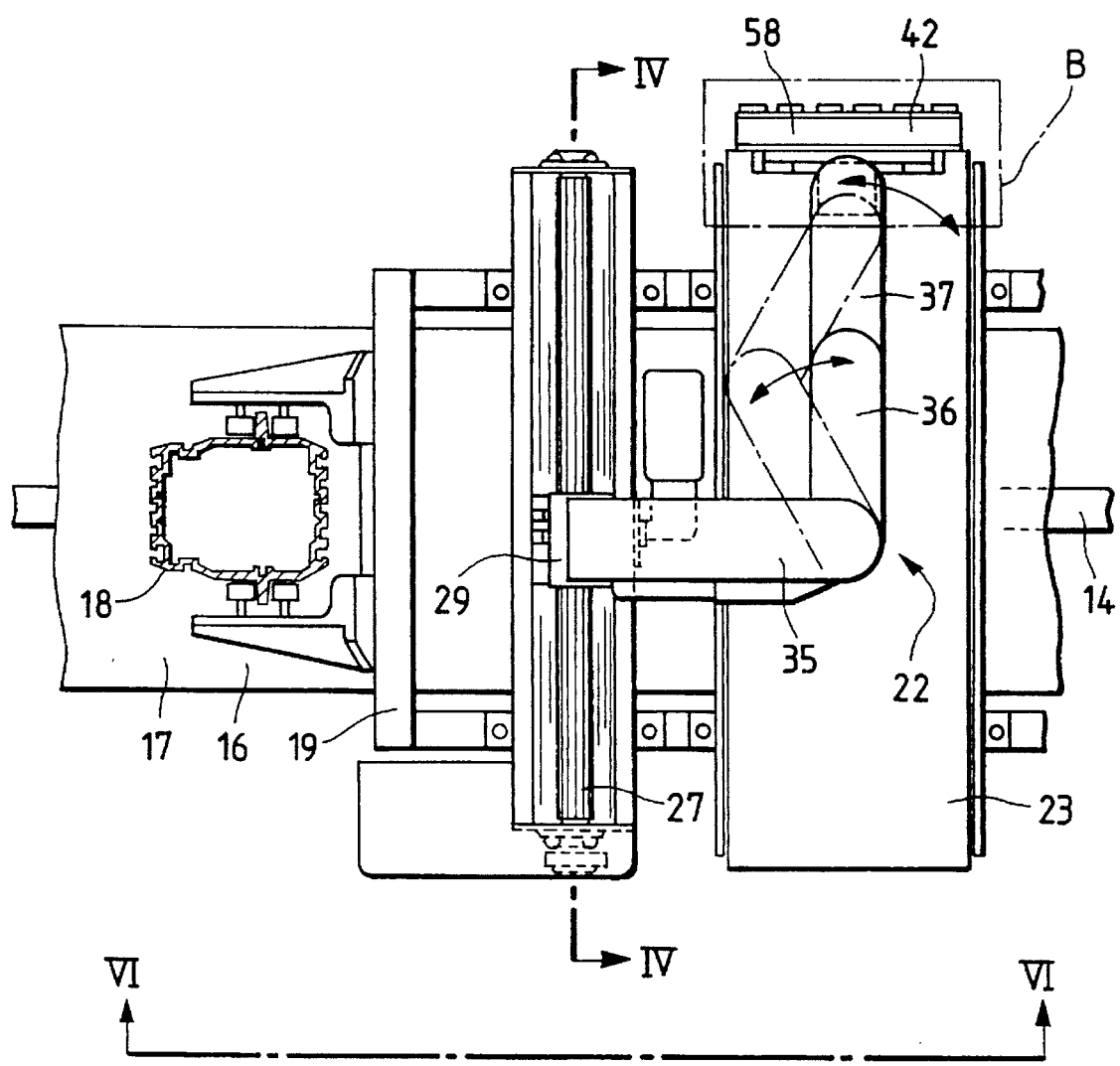
FIG. 3 is an enlarged view of portion A shown in FIG. 1.

The present invention will be described hereinunder on the basis of an embodiment thereof illustrated in the drawings. In this specification, "front" indicates the lower side in FIG. 1, "back" indicates the upper side in the same figure, "left" indicates the left-hand side in the same figure, and "right" indicates the right-hand side in the same figure.

A pair of front and back rack units 1 are erected on the floor surface so as to define a stacker crane passage 12.

The rack units 1 are each provided with a large number of front-side support rods 2 arranged right and left at predetermined intervals, a large number of back-side support rods 2 arranged behind and at a predetermined spacing from the front-side support rods 2, and horizontal, plate-like, article storage racks 3 secured to the support rods 2 spaced from each other in the height direction on a predetermined spacing.

Entrance/exit openings 6 of the article storage racks 3 are opposed to each other in the front and back rack units 1.

Articles W are stored on the article storage racks 3 in such a manner that their vertical faces on the stacker crane passage 12 side are completely or nearly flush with one another.

On the left-hand side of the rack units 1 are disposed warehousing/delivery roller conveyors 8 whose conveyance direction is the right-left direction.

On the rack unit side of each warehousing/delivery roller conveyor 8 is provided a stopper 9 so as to be movable right and left by means of an actuator 10, such as a linear solenoid, or the like, the stopper 9 coming into abutment with an article W which has been conveyed to the rack unit side by the roller conveyor 8. The stopper 9 is adapted to move right and left in accordance with the width of the article W so that the center in the right-left direction of an article carrying conveyor 23 of a stacker crane 16, to be described later, which has stopped in the position for receiving the article W from the roller conveyor 8 and the center in the right-left direction of the article W on the roller conveyor 8 are aligned with each other. Though not shown, a width detector for detecting the right-left width of the article W is attached to a predetermined part of the warehousing/delivery roller conveyor 8.

In the stacker crane passage 12 are disposed a pair of upper and lower guide rails 14 in such a manner that their longitudinal direction corresponds to the right-left direction in FIG. 1. The stacker crane 16, which is guided movably right and left along the guide rails 14, is provided with a traveling flatcar 17, a lift 19 which is movable vertically along a pair of masts 18 erected on the traveling flatcar 17, and a pair of right and left article transfer apparatuses 22 mounted on the lift 19 and which will be described in detail below.

The article transfer apparatuses 22 are each provided with an article carrying conveyor 23, such as a driving belt conveyor or the like, mounted on the lift 19 and whose conveyance direction is the front-back direction, that is, perpendicular to a row of article storage racks, and an article holder 42 which is movable in the front-back direction and which is retractable to an upper position not colliding or interfering with an article W present on the article carrying conveyor 23.

A detailed description will be provided below about means for moving the article holder 42 back and forth and means for moving the holder 42 up and down, etc.

Figure 4:
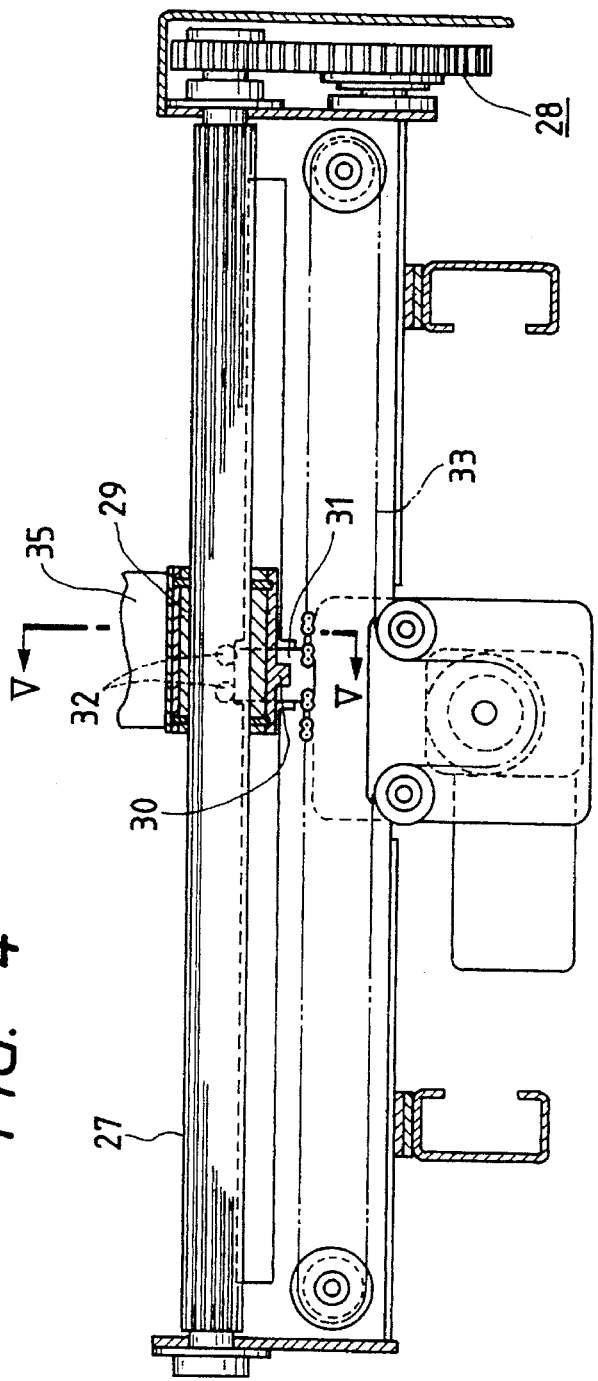
FIG. 4 is an enlarged sectional view taken along line IV—IV in FIG. 3.
Figure 5:
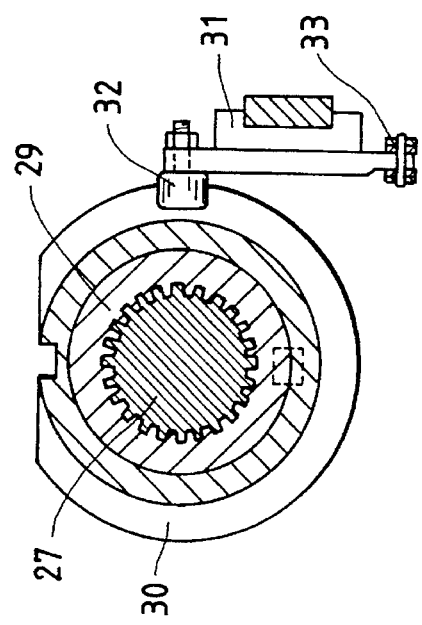
FIG. 5 is an enlarged sectional view taken along line V—V in FIG. 4.
Figure 6:
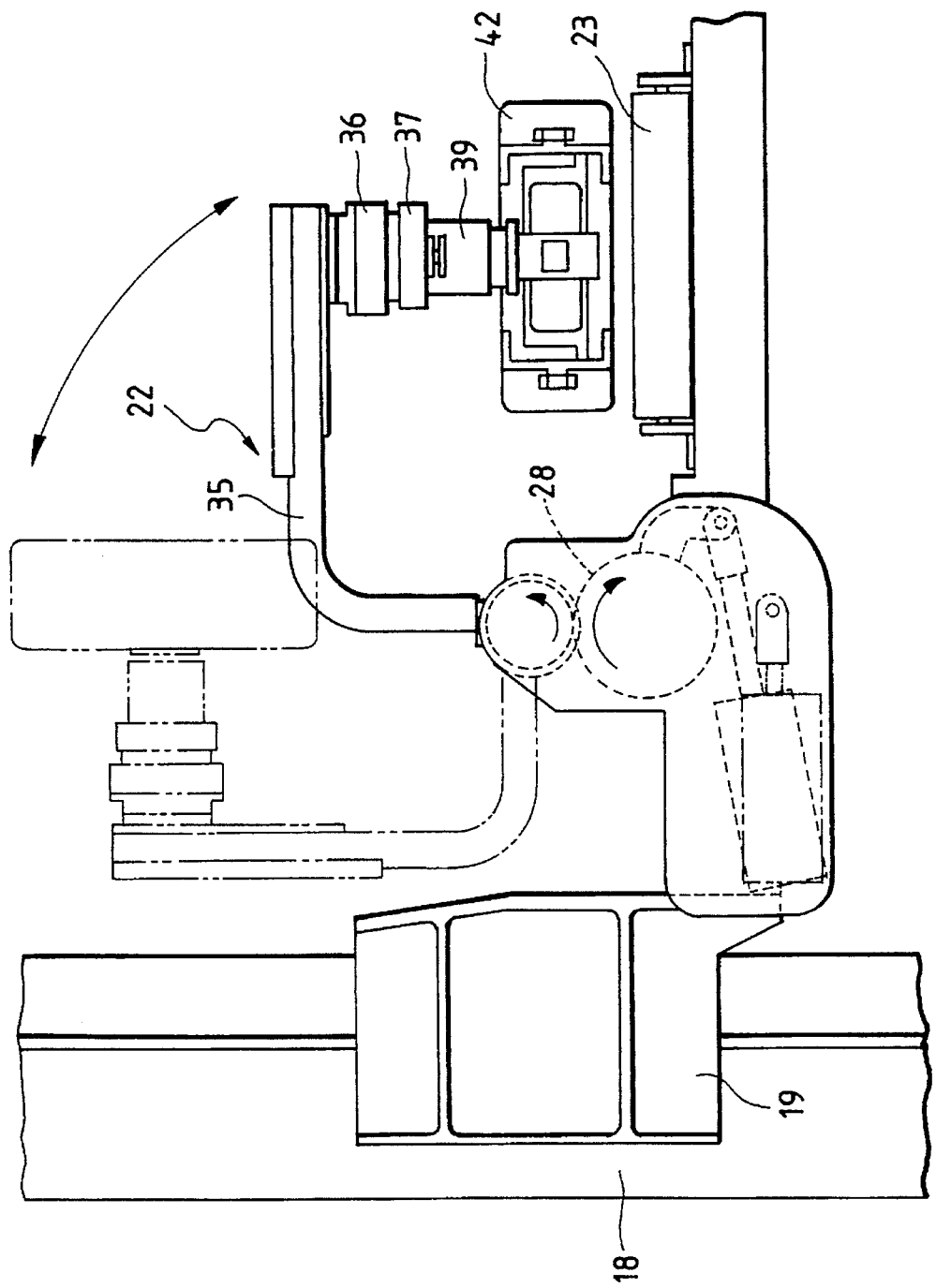
FIG. 6 is an enlarged side view taken along line VI—VI in FIG. 3.
Figure 7:
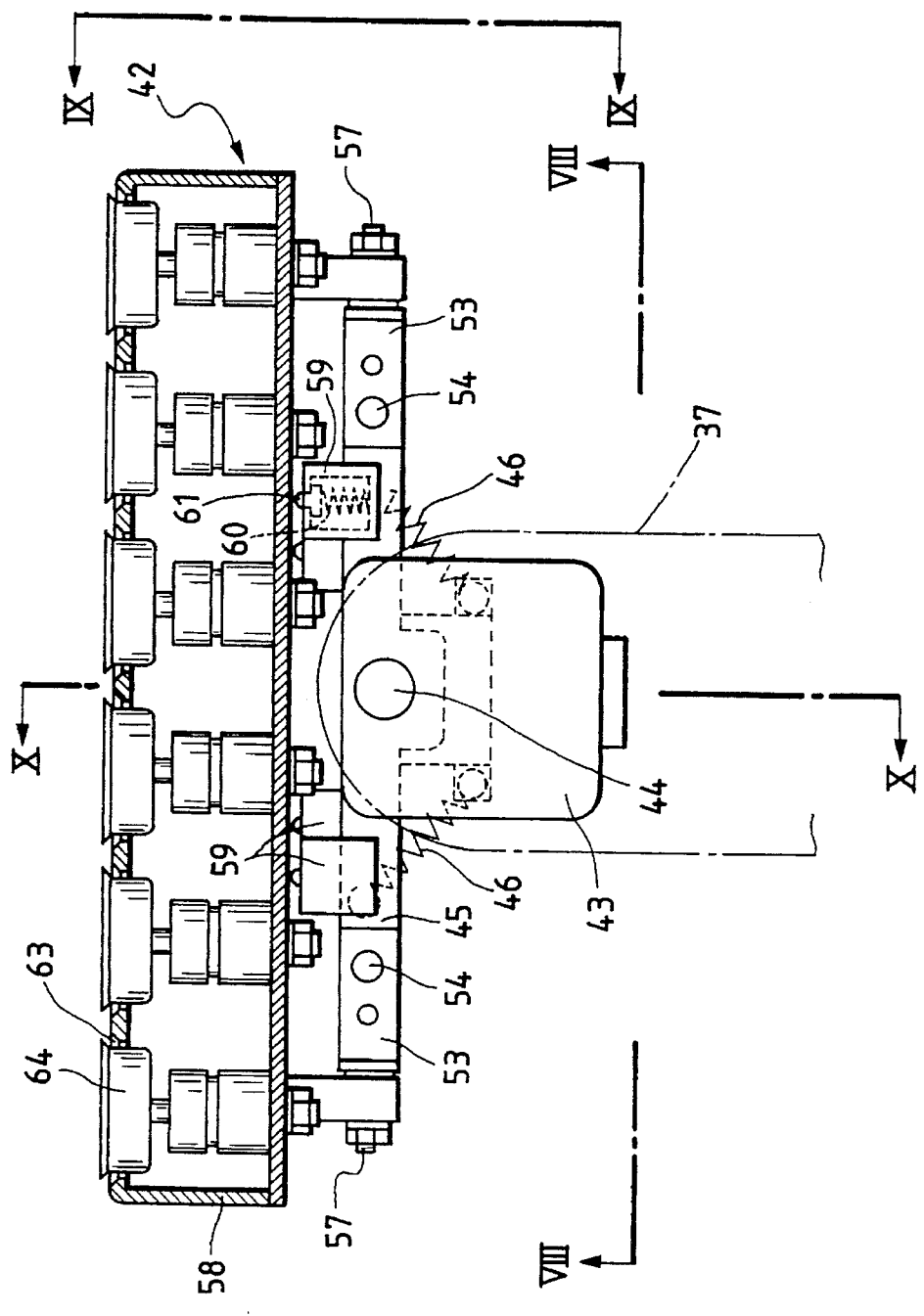
FIG. 7 is an enlarged sectional view of portion B shown in FIG. 3.
Figure 8:
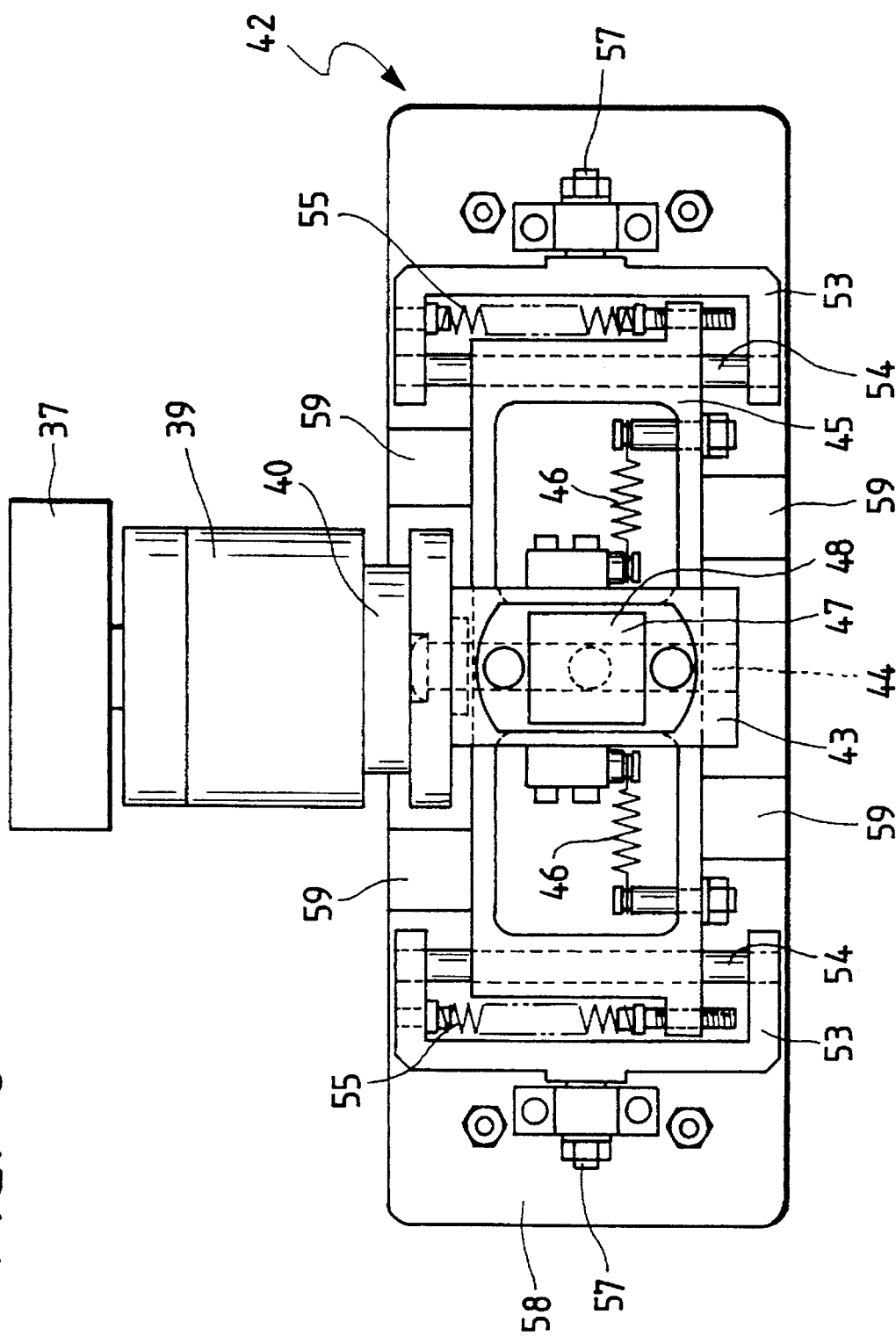
FIG. 8 is a side view taken along line VIII—VIII in FIG. 7.
Figure 9:
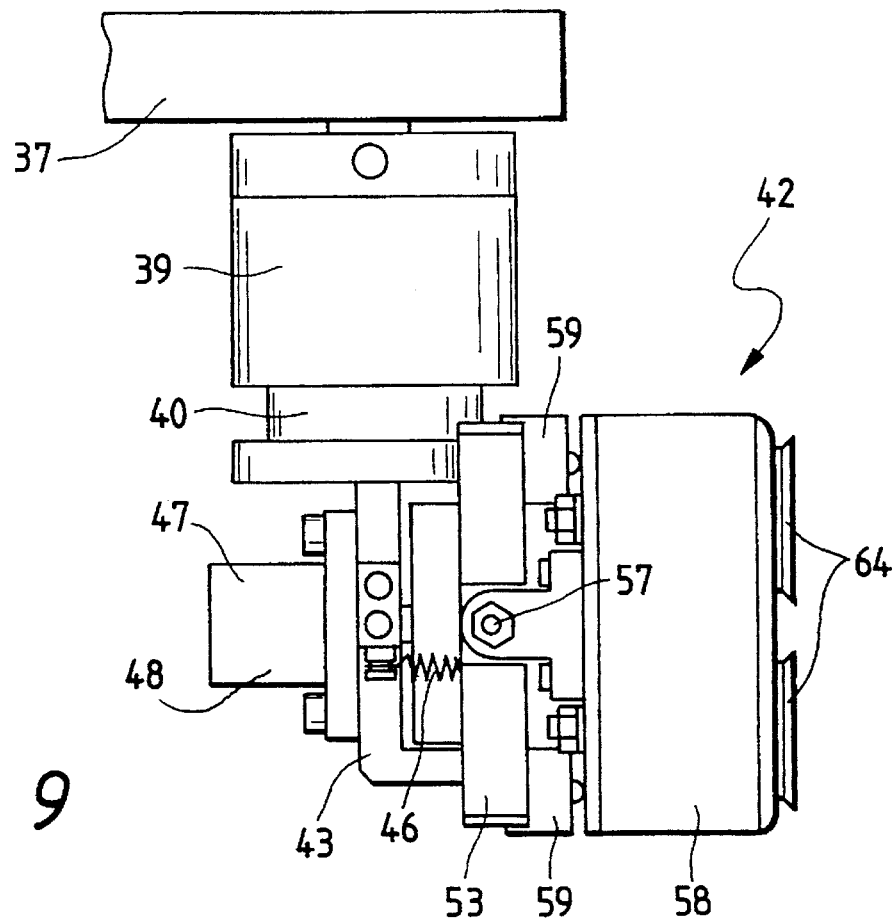
FIG. 9 is a rear view taken along line IX—IX in FIG. 7.
Figure 10:
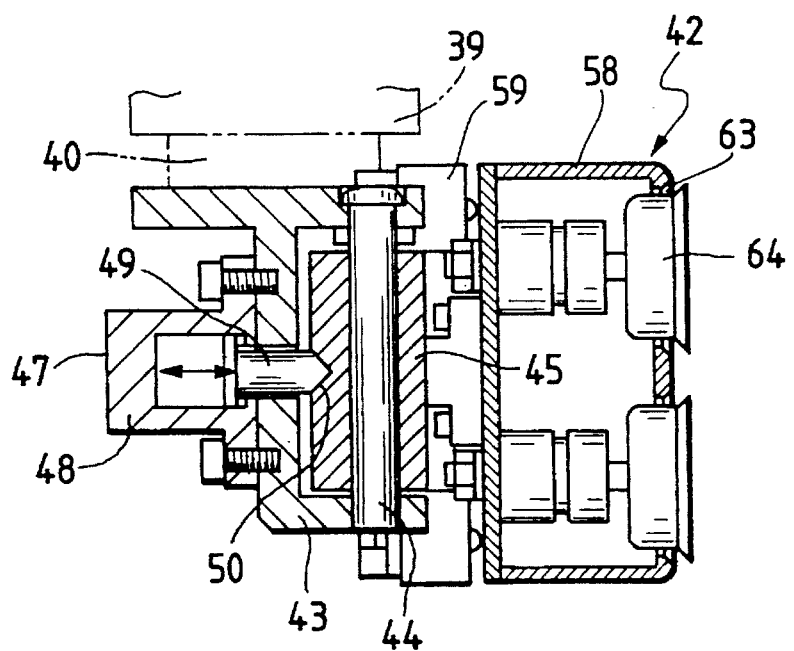
FIG. 10 is a sectional view taken along line X—X in FIG. 7.

A spline shaft 27 (FIGS. 4 and 5) is rotatably provided sideways of the article carrying conveyor 23 on the lift 19 in such a manner that its axis extends in the front-back direction. The spline shaft 27 is rotated by means of an actuator 28 which includes a linear solenoid, or the like. A front-back moving member 29 is fitted on the spline shaft 27 so as to be movable back and forth without rotation relative to the spline shaft. The front-back moving member 29 is formed with an arcuate projecting wall 30 which is concentric with the spline shaft 27, and a slide member 31 having a pair of gripping rollers 32 for gripping the arcuate projecting wall 30 is provided on the lift 19 in a front-back slidable manner. The slide member 31 is moved back and forth by means of a known actuator 33 including a motor-driven endless chain capable of moving in forward and reverse directions, or the like. In this construction, the front-back moving member 29 can be moved back and forth by moving the slide member 31 back and forth. On the other hand, since the arcuate projecting wall 30 of the front-back moving member 29 is gripped by the gripping rollers 32 of the slide member 31, the front-back moving member 29 can rotate together with the spline shaft 27 without being restrained by the slide member 31.

A support arm 35 is secured to the front-back moving member 29 so that a free end thereof is positioned above the center in the right-left direction of the article carrying conveyor 23, and a first swing arm 36 is connected horizontally swingably to the support arm 35. Further, a second swing arm 37 is connected horizontally swingably to a free end of the first swing arm 36, and a motor 39 having a rotating shaft 40 which faces downward is connected to a free end of the second swing arm 37 horizontally rotatably and concentrically with the rotating shaft 40. The article holder 42 is mounted on the rotating shaft 40 of the motor 39. In such a construction, the article holder 42 is rotated horizontally by rotating the shaft 40 of the motor 39, and thus the direction of the article holder 42 can be changed.

By means of a known swing controller, the first swing arm 36, second swing arm 37 and motor 39 (article holder 42) are adapted to swing or rotate in such a manner that upon the swing of the first swing arm 36 by a predetermined angle θ, the second swing arm 37 swings by angles of 2θ the opposite direction relative to the first swing arm 36, and the motor 39 (article holder 42) rotates by an angle of θ in the opposite direction relative to the second swing arm 37. The rotational position of the rotating shaft 40 is adjusted so that the article holder 42 faces to the front or the back in an overlapped state of the first and second swing arms 36, 37. Therefore, even if the rotating shaft 40 is maintained in that state without rotation, the article holder 42 always faces in the predetermined direction irrespective of the swing motions of the first and second arms 36 and 37.

A base frame 43 of the article holder 42 is fixed to the rotating shaft 40 of the motor 39, and a transversely long, horizontal swing member 45 is connected to the base frame 43 so as to be horizontally swingably at its center in the right-left direction through a center shaft 44 whose axis extends in the up-down direction. By virtue of a pair of springs 46 the horizontal swing member 45 reverts to its neutral position automatically when the force of changing its direction no longer works thereon. With the neutral position being kept, the horizontal swing member 45 is locked by means of a locking device 47. The locking device 47 has a lock pin 49 which is movable horizontally through the base frame 43 by being actuated with an actuator 48, such as a linear solenoid or the like, and a recess 50 formed in the horizontal swing member 45 for fitting therein of the lock pin 49. In this construction, when the force of changing the direction of the horizontal swing member 45 has come to no longer work thereon, the lock pin 49 which has been retracted is brought into engagement with the recess 50, whereby the horizontal swing member 45 can be locked against its horizontal swing. On the other hand, by pulling out the lock pin 49 from the recess 50, the horizontal swing member 45 can be brought into a horizontally swingable state.

At right and left portions of the horizontal swing member 45 are provided a pair of right and left up-down moving members 53 so that they can be moved up and down, respectively, by means of slide shafts 54 whose axes extend in the up-down direction. Between the up-down moving members 53 and the horizontal swing member 45 are disposed springs 55. The springs 55 support the up-down moving member 53 so as permit both upward and downward movements of the members 53.

A suction cup case 58 is connected to the up-down moving members 53 so as to be swingable in the up-down direction through a pin 57 whose axis extends in the right-left direction. In the upper and lower portions of the horizontal swing member 45 are provided urging means 59 for urging the suction cup case 58 in the direction of moving away from the horizontal swing member 45. By virtue of springs 60 of the urging means 59, lugs 61 projecting toward the suction cup case 58 are urged into abutment with the case 58. According to this construction, the suction cup case 58 retains its perpendicular state when no force is exerted thereon, while upon exertion thereon of an external force which causes the case 58 to swing up or down, the lugs 61 retract against the biasing force of the springs 60, so that the case 58 swings up or down in accordance with the said external force.

A predetermined number of openings 63 are formed in the side wall of the suction cup case 58 on the side opposite to the horizontal swing member 45, and suction cups 64 accommodated in the case 58 are projecting to the exterior from the openings 63. As is well known, the suction cups 64 are each connected to an air supply unit (not shown).

The wall having the openings 63 of the suction cup case 58 acts as a pusher when an article W is pushed to prevent a burden from being imposed on the suction cups 64. The front end portion of each suction cup 64 is formed of a pressure-sensitive, electroconductive rubber, or the like, to sense the article W, whereby it is made possible to detect abutment of the article W with the suction cup 64.

The following description is now provided about the operation of the embodiment.

After suction and attraction of the suction cups 64 against the article W, the first and second swing arms 36, 37 are folded, and simultaneously with such folding operation the front-back moving member 29 is moved. Also, substantially in synchronism with the speed of the resulting pull-in of the article the article carrying conveyor 23 is driven in the article W pulling-in direction, whereby any friction effect between the article carrying conveyor 23 and the article W is reduced, thus permitting the article W to be put smoothly onto the conveyor 23. At the time of attracting the article W by the suction cups 64, the lock pin 49 of the locking device 47 is withdrawn from the recess 50, so that the horizontal swing member 45 and the cups 64 mounted thereon can be positioned along a side face of the article and hence the article side face can be attracted positively by the suction cups 64.

By moving the front-back moving member 29 in addition to the folding motions of the first and second swing arms 36, 37, even in the case of an article W which is stored in an inner part of the article storage rack 3, it can be sucked and pulled in easily.

On the other hand, by performing the extension of the first and second swing arms 36, 37, or by performing the movement of the front-back moving member 29 simultaneously with the said extension, and by driving the article carrying conveyor 23 in the push-out direction of the article W substantially in synchronism with the push-out speed, it is made possible to diminish the friction effect operating between the article carrying conveyor 23 and the article W, and the article W can be taken down smoothly onto the article storage rack 3, or the like, on the article pulled-in side from the conveyor 23. At the time of expulsion of the article W, since the lock pin 49 is fitted in the recess 50 to prevent movement of the horizontal swing member 45, and the cup case 58 attached thereto from swinging horizontally right and left, the article W can be pushed out smoothly while it is prevented from oscillating right and left.

Further, by causing the front-back moving member 29 to move, in addition to the extending motions of the first and second swing arms 36, 37, the article W can be pushed out, for example, to the inner portion of the article storage rack 3, thus permitting a plurality of relatively small articles W to be arranged and stored in the depth direction of the rack 3.

In the case where the article W is to be pushed out in the direction opposite to the direction in which it has been pulled in onto the article carrying conveyor 23, the first and second swing arms 36, 37 are once brought into an overlapped state, then the spline shaft 27 is rotated whereby the article holder 42 is allowed to swing to the upper side and, thereafter, the direction of the article holder 42 is reversed by operating the motor 39, so that subsequently, the front-back moving member 29 is moved to the opposite side. Thereafter, the article holder 42 is brought down so that the suction cups 64 become opposed to the side face of the article W opposite to the article side face which has been sucked by the suction cups 64 in the article pulling-in operation. In this case, if the article W is large-sized, it may be an obstacle to the descending motion of the article holder 42. Such an inconvenience can be avoided by driving the article carrying conveyor 23 until the article W reaches a position where it does not collide or interfere with the article holder 42. It will be seen that by this operation the article holder 42 can be brought into a state as if it had been pulled in from the article push-out direction. Thereafter, by performing the foregoing operations, the article W can be pushed out in the direction opposite to the direction in which it has been pulled in onto the article carrying conveyor 23.

The above embodiment has the following advantages.

(1) Since the article W is sucked by the suction cups 64, it is not damaged while it is held.

(2) Since the suction cups 64 can freely swing horizontally and move and swing up and down, it is possible to suck and attract the article W positively even in the event of an error in misalignment occurring in the article-moving direction, for example.

(3) Since the article holder 42 can be projected largely to the front and the back from the lift 19, the article W spaced from the lift 19 can be pulled in onto the article carrying conveyor 23, and, conversely, it is also possible to push out the article W to a position spaced apart from the lift 29. Modifications may be made, for example:

(1) The suction cups 64 may be substituted by a pair of right and left gripping pieces capable of approaching and leaving each other to grip the article W from right and left in the article holder 42.

(2) Without using the first and second swing arms 36, 37, the casing body of the motor 39 may be mounted directly to the support arm 35.

According to the present invention constructed as above the are attained the following effects.

According to the invention, an article on the article carrier having a conveyor can be carried out smoothly in the front-back direction by cooperation of both article carrier and article holder, so the space for vertical movement of the slide fork, which space has heretofore been required between the article on an article storage rack and the adjacent rack is no longer necessary and hence the article storage efficiency can be so much enhanced. Moreover, since each article storage rack is not required to have a slide fork passing clearance, the article transfer apparatus of the present invention is applicable also to an article storage rack formed by a single plate. Further, in the case of pushing out an article in the direction opposite to the article pulling-in direction, it is possible to effect re-grasping of the article easily by retracting the article holder from above the article carrier to a position not interfering with the article.

Furthermore, according to the invention, an article can be pulled in easily onto the article carrier by sucking a side face of the article. The article holder can be retracted easily from above the article carrier by rotating the spline shaft to swing the article holder to the upper side.

What is claimed is:

1. An article transfer apparatus movable along a row of article storage racks, comprising:

an article carrier provided with a conveyor and means for moving said conveyor substantially perpendicular to the row of the article storage racks;

an article holder disposed adjacent said article carrier and being movable between said row of article storage racks and said article carrier, said article holder including a base frame carrying a suction cup case containing a plurality of suction cups and means for connecting said suction cup case with respect to said base frame for horizontal pivotal movement with respect thereto; and means for moving said article holder between said article storage racks and said article carrier including:
  support means,
    means for moving said support means between said article storage racks and said article carrier,
    a plurality of articulated swing arms connecting said article holder to said support means, and
    means for controllably, driving said swing arms for selectively moving said article holder with respect to said article carrier.

2. An article transfer apparatus according to claim 1, in which said article holder moving means comprises:
  a spline shaft disposed rotatably on each of right and left sides of said article carrier, each said spline shaft having an axis extending substantially in a direction perpendicular to the row of racks;
  a front-back moving member fitted on each said spline shaft and being movable axially therealong;
  a first swing arm pivotally connected to a support arm secured to said front-back moving member and being horizontally swingable;
  a second swing arm pivotally connected to a free end of said first swing arm and being horizontally swingable;
  said article holder being connected horizontally to a free end of said second swing arm; and
  means for moving said article holder including means for moving said first and second swing arms, and means for selectively interlocking said article holder to said second swing arm such that said article holder is directed in a predetermined direction.

3. An article transfer apparatus according to claim 1, wherein said article holder includes said base frame connected to said articulated swing arms, a horizontal swing member pivotally connected to said base frame, lock means mounted on said base frame and having a lock pin selectively movable horizontally for releasably engaging said swing member, and a pair of right and left up-down moving members provided at both side portions of the horizontal swing member and connecting said suction cup case thereto, and means for moving said right and left up-down moving members with respect to said horizontal swing member.

4. An article transfer apparatus according to claim 2, wherein said article holder includes said base frame connected to said second swing arm, a horizontal swing member pivotally connected to said base frame, lock means mounted on said base frame and having a lock pin selectively movable horizontally for releasably engaging said swing member, and a pair of right and left up-down moving members provided at both side portions of the horizontal swing member and connecting said suction cup case thereto, and means for moving for moving said right and left up-down moving members with respect to said horizontal swing member.

\* \* \* \* \*